May 21, 1963  L. ALFILLE  3,090,743
NUCLEAR REACTOR DUCT STRUCTURE
Filed April 15, 1960 4 Sheets-Sheet 1

INVENTOR
LUCIEN ALFILLE
BY Cameron, Kerkam + Sutton
ATTORNEYS

May 21, 1963          L. ALFILLE          3,090,743
NUCLEAR REACTOR DUCT STRUCTURE
Filed April 15, 1960                    4 Sheets-Sheet 2

INVENTOR
LUCIEN ALFILLE
BY Cameron, Kerkam + Sutton
ATTORNEYS

May 21, 1963 L. ALFILLE 3,090,743
NUCLEAR REACTOR DUCT STRUCTURE
Filed April 15, 1960 4 Sheets-Sheet 3

INVENTOR
LUCIEN ALFILLE
BY Cameron, Kerkam & Sutton
ATTORNEYS

INVENTOR
LUCIEN ALFILLE

United States Patent Office 3,090,743
Patented May 21, 1963

3,090,743
NUCLEAR REACTOR DUCT STRUCTURE
Lucien Aifille, Orsay, France, assignor to Commissariat a l'Energie Atomique, Paris, France
Filed Apr. 15, 1960, Ser. No. 22,617
9 Claims. (Cl. 204—193.2)

The use of a compressed gas as a cooling fluid in nuclear power reactors employing natural uranium and moderated with heavy water has proved to be extremely advantageous. Such an arrangement requires force tubes inside which the compressed fluid (for example $CO_2$ at a pressure of 80 to 100 atmospheres) circulates; the structure of these tubes, the method by which they are fixed and the way in which they are arranged in reactors involve certain problems which have been solved, for large power units, as explained hereinafter with reference to FIGURES 1 and 2, which are axial sections through the tubes.

FIGURE 1 shows the heavy water 1 which remains at low temperature, of the order of 50° C., a receiving tube 2 providing a fluid-tight seal for the heavy water and complying with corrosion standards in heavy water at this temperature; a force tube 3 made of magnesium alloy, which remains at a temperature of the order of 60 to 70° C. and withstands the pressure of the $CO_2$, which is of the order of 80 atmospheres, a heat-insulator 4 which prevents heat transfer from the cooling gas to the force tube, and a guide tube 5. The guide tube 5 has the following functions: supporting the heat-insulator 4 and holding it geometrically, and guiding the fuel cartridges, not illustrated in the figure, in the duct 6 during loading and unloading operations when hot, in order to prevent the heat-insulator from being damaged by the hot (about 450° C.) sheath of the fuel cartridges; the sheaths are generally finned, and such damage may accordingly be very great.

In the variant illustrated in FIGURE 2, the force tube 3 is coupled with the receiving tube in such a way as itself to form a sealing barrier for the heavy water. In other variants there is no heat-insulator, and the force tube 3 is then relatively hot; the presence of a tube for guiding the cartridges then enables damage to the force tube by the hot fins of the fuel cartridge to be prevented; in this case, however, when a fairly hard material such as beryllium is used for the force tube, there is no fear of such damage.

Other types of nuclear reactors also require the use of a guide tube for the fuel elements; this is the case, for example, in high-temperature reactors in which the moderator is beryllia and the cooling medium is air under pressure circulating in ducts cut in the beryllia, at a speed of the order of 120 metres per second so as to give extremely effective cooling; the fuel is used in the form of clusters of a fritted uranium-magnesia material sheathed with refractory stainless steel. Deformation of the beryllia lattice, and likewise of the clusters, may cause the latter to become jammed in the beryllia ducts, in view of the fact that there is very little play between the fuel and the moderator in reactors of this type; the presence of a guide tube eliminates any risk of the fuel clusters from becoming jammed by preventing them from becoming fast with the berylia stack; the fuel is then made fast with the guide tube, and play of the order of one centimetre is left between the guide tube and the beryllia stack.

The various materials considered for manufacturing guide tubes are aluminium and its alloys, magnesium and its alloys, beryllium, zirconium and its alloys, stainless steel.

As regards low-temperature reactors, in which the guide tube temperature is of the order of 500° C., aluminium and its alloys have the disadvantage of giving a eutectic point at about 440° C., involving a large variation in their properties, and of absorbing neutrons to a fairly large degree, which has a particularly bad effect on the reactivity of natural-uranium reactors; magnesium and its alloys have the disadvantage of becoming deformed at the temperatures under consideration, and of being subject to surface tearing during loading and unloading operations when hot.

The properties of beryllium and zirconium make these metals advantageous for the use considered above, but they cannot at present be used on the industrial scale, on the one hand because they are very expensive, and on the other hand because a start has not yet been made on manufacturing them in the form of large-diameter long tubes, of the order of ten centimetres in diameter and several metres long, for example. Moreover, it must be stated that in certain cases the fragility of beryllium may prejudice its use as a structural material, either for a force tube or for a guide tube. The use of beryllium as a structural material in nuclear reactors only appears to be really satisfactory when the functions of a slide-way for the fuel elements (guide tube) and possibly of withstanding the cooling fluid pressure (force tube) are combined, which leads to the use of considerable thicknesses of beryllium.

The use of stainless steel for the guide tubes leads to the adoption of considerable thicknesses to obtain acceptable rigidity, involving a loss of reactivity in the reactor through neutron-absorption; conversely, a tolerable thickness as regards neutron-absorption, for example of the order of $4/100$ to $7/100$ mm., leads to a lack of rigidity, so that local pressure variations due to turbulent flow of the cooling fluid set up vibration under conditions which cannot be accepted if the guide tube is to behave satisfactorily.

In high-temperature nuclear reactors requiring a guide tube, the latter can be made of refractory stainless steel, but the use of this material involves the same disadvantages as those mentioned above in relation to low-temperature reactors.

The present invention relates to a nuclear reactor duct structure of the type in which a group of tubes guides fuel cartridges and gives adequate resistance to cooling fluid pressure.

This structure is characterized in that it comprises a vitreous silica tube for guiding the fuel elements, the said tube having a very smooth surface, and being in one piece or made up of a plurality of sections disposed following upon one another, flexible and deformable connecting members being disposed at the ends of the guide tube, and laterally between the said tube and the adjacent structural elements, and also between the ends of the sections in the case of a tube made up of a plurality thereof. The vitreous silica tube may be drawn or moulded in opaque or transparent form.

Moreover, vitreous silica having a very smooth surface may be used, in conjunction with the foregoing flexible and deformable connecting members, for other purposes than a guide tube forming a structural element in nuclear reactors.

The disappearance of incipient fractures, such as scratches, fissures and cracks, has the effect of appreciably increasing the mechanical resistance of vitreous silica structural elements; it will therefore be necessary to pay particular attention to treating raw products made of vitreous silica in such a way as to make them smooth, for example by mechanical and/or chemical polishing. Treating vitreous silica rods with hydrofluoric acid enables them to be given ten times as much resistance to bending; tensile resistance is also appreciably increased; moreover, the fragility of glasses is largely due to the fact that they have practically no plasticity and that stresses are consequently concentrated in zones exhibiting surface faults, and the foregoing treatment therefore enables their resistance to mechanical shocks to be considerably increased.

Contact is avoided between vitreous silica structural elements and hard substances used as structural elements in nuclear reactors, so as to prevent the occurrence of shocks which would be harmful in view of the fragility of vitreous silica.

The use of vitreous silica enables the thermal shocks which occur when the safety rods of the reactor are accidentally dropped to be conveniently withstood; among industrial glasses, vitreous silica is one of those which exhibit the greatest resistance to thermal shocks; it should be noted that this property is augmented by surface-polishing treatment. When the conditions of use are such that thermal shocks are particularly heavy or frequent, it is preferable to use transparent vitreous silica, which stands up exceptionally well to thermal shocks; a transparent vitreous silica guide tube 30 mm. in diameter and 2 mm. thick may be heated about twenty times to 1200° C. in a blow-pipe flame and cooled from 1200° C. to ambient temperature in approximately 1 to 1.5 seconds without exhibiting any deterioration such as fissures, cracks or opacity.

Another advantage of using various kinds of vitreous silica as structural elements in nuclear reactors resides in the fact that this material is very hard, which prevents the internal surface of the guide tubes from being abraded or damaged (tearing, scratches, etc.) when fuel elements are being loaded and unloaded; moreover, since the said surface has been polished, there is very good resistance to abrasion by rapid currents of fluid.

Variations in the geometrical dimensions of vitreous silica structural elements under the effect of irradiation take the form of contraction of the order of one percent at ambient temperature (neutron and gamma irradiation); according to a feature of the invention, dimensional variations are absorbed by flexible and deformable members; these variations may be absorbed longitudinally by means of compensating systems comprising springs; if they are absorbed transversely, any possible disadvantages due to such contraction are avoided, for example by placing the vitreous silica structural elements laterally in contact with the adjacent structural elements of non-siliceous material when these latter elements possess a certain capacity for deformation (heat-insulator), or by leaving lateral play between these two kinds of structural elements; in the case of vitreous silica guide tubes, play is left between the fuel elements and the internal surface of the said tubes as well as between their external surface and the adjacent materials, systems comprising springs then enabling the guide tubes to be laterally centered.

When the vitreous silica structural elements have to be split up, pieces of plastic metal are interposed between the various sections in order to prevent concentrations of stresses at each junction.

When the vitreous silica structural elements are guide tubes, the pieces of plastic metal take the form of rings; the metal used must be plastic under the prevailing conditions of temperature, pressure and irradiation: for example, aluminium is suitable for low- and medium-temperature reactors, and stainless steel for high-temperature reactors; furthermore, such rings may be disposed at the ends of the tube when it is in one piece just as much as when it is split up.

Possibilities of vibration in vitreous silica guide tubes are reduced under conditions of use in view of the fact that irradiating them considerably increases their damping capacity; it is in fact known that if a sample has its resonance band in the vicinity of 100 kilocycles per second, irradiation may increase the bandwidth from 2 cycles per second to 100 cycles per second; it is most advantageous to use this phenomenon, since in its absence the amplitude of any possible vibration in vitreous silica structural elements would run the risk of reaching values which would not be tolerated in view of the behaviour of a material without any capacity for plastic deformation; moreover, it must be stated that irradiation generally has the opposite effect of reducing the vibration-damping capacity of metals; when the vitreous silica structural elements are guide tubes, they may therefore be made thick enough to reduce considerably the possibilities of vibration in sympathy with the turbulent flow of cooling fluid, it being possible to support the guide tube for this purpose by a force tube made of a material of a different kind surrounding the guide tube.

If the vitreous silica tube is made of appreciable thickness when it is in one piece, it may be made to act both as a guide tube and a force tube, without any need for the provision of another tube made of a non-siliceous material for this latter purpose.

When the force tube which may surround the guide tube must remain at low temperature, for example about 60° C., the use of vitreous silica as the material for guide tubes enables the thickness of heat-insulator disposed in this case between the force tube and the guide tube to be reduced, since the guide tube has good heat-insulating properties.

Another advantage of vitreous silica resides in its very good resistance to chemical corrosion by $CO_2$ or air, even at high temperatures, imparting to this material excellent behaviour as regards corrosion in high-temperature reactors.

Another advantage resides in the fact that vitreous silica is structurally stable under the effect of irradiation to which it is subjected inside nuclear reactors, that is to say that it cannot evolve under these conditions towards crystalline structures such as quartz, trydimite and cristobalite, and that the effect of contraction is reduced at high temperatures, the thermal treatment probably making up for the effects of irradiation.

One of the principal advantages of the invention finally resides in the fact that, for a given thickness, vitreous silica structural elements absorb neutrons much less than aluminium or steel; their neutron-absorption capacity is about as great as that of magnesium, which is perfectly acceptable; this latter comparison applies to the usual commercial forms of vitreous silica and magnesium.

Two embodiments of the invention will now be described by way of example only with reference to the appended diagrammatic FIGURES 3 to 9, in which.

Only the elements required for an understanding of the invention are illustrated in these figures, corresponding elements in the various figures bearing identical references.

Figure 1:
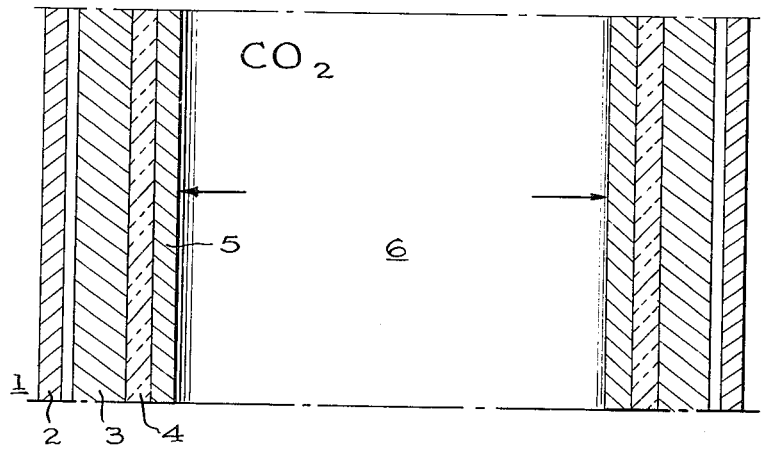
Figure 2:
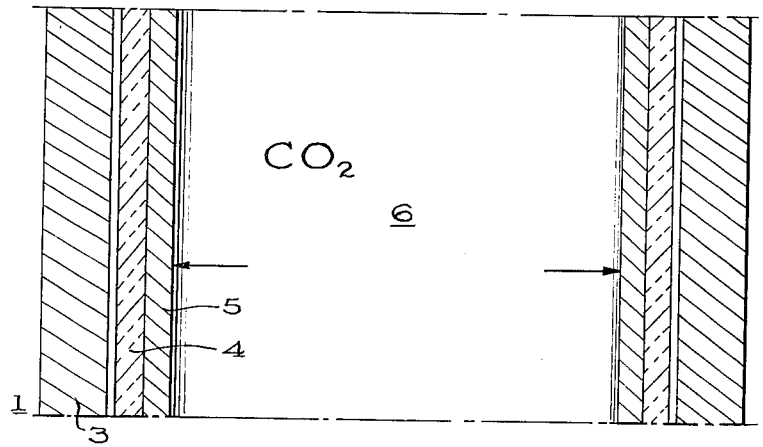
Figure 3:
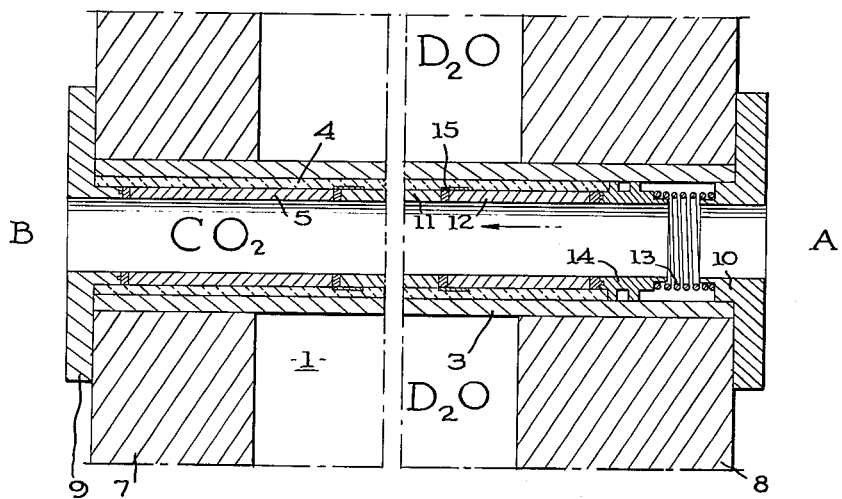
FIGURE 3 illustrates an axial section through a horizontal duct in a natural-uranium nuclear reactor moderated with heavy water, equipped with a vitreous silica guide tube.

FIGURE 3 shows a tube which acts both as a force tube and a receptacle which is fluid-tight with respect to the mass of heavy water 1, end plates 7 and 8, heat-insulator 4, vitreous silica guide tube 5 and bushes 9 and 10. The cooling fluid is $CO_2$, at a temperature of 450° to 500° C. and a pressure of 80 atmospheres. The $CO_2$ and the fuel elements circulate from A to B inside the guide tube 5, which is divided into a plurality of sections, such as 11 and 12, one to two metres long; the total length of the tube is approximately that of the duct, for example six metres, while the internal diameter of the guide tube is 100 mm., and its thickness is 4 to 5 mm. A compensating system comprising a spring 13 and a guide bush 14 for the said spring enables longitudinal contraction of the guide tube under the action of radiation to be overcome; the freedom of movement of the guide bush 14, which forms an abutment for the section 12 of the guide tube, is of the order of fifty millimetres. The various sections of the guide tube are fitted together by means of plastic metal rings, such as the ring 15 for the sections 11 and 12.

In a preliminary operation, the internal and external surfaces of the various sections of the guide tube 5 are polished by scrubbing with hydrofluoric acid in order to eliminate any scratches which might act as incipient fractures.

The various sections are practically unstressed, and support only the weight of the fuel elements resting in the tube; in any case, under the prevailing conditions of use, the plastic metal rings such as 15 enable any possible concentrations of stresses at the junctions of the said sections to be avoided.

Figure 4:
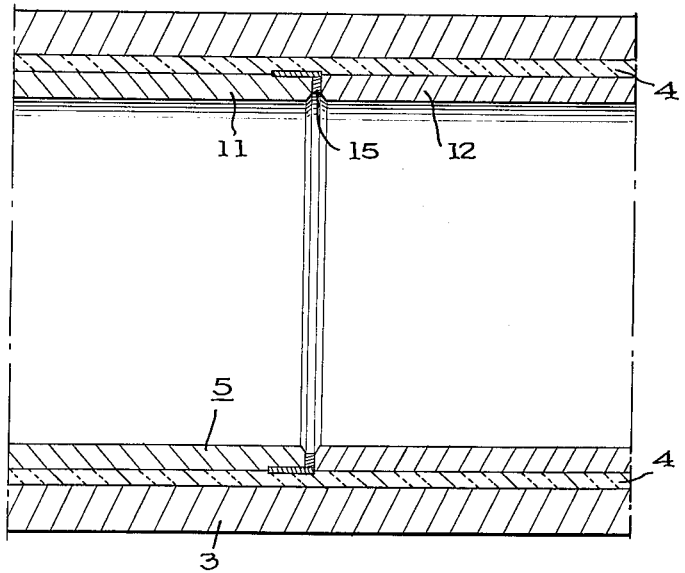
FIGURE 4 illustrates an axial section through the said duct on a level with the junction between two parts of the guide tube.

FIGURE 4 shows the duct structure in the reactor on a level with one of the junctions.

Figure 5:
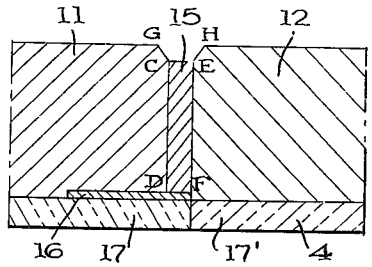
FIGURE 5 illustrates a detail view of the said junction.

The structure of this junction will be described with reference to FIGURE 5.

This figure shows the plastic metal ring 15 interposed between the sections 11 and 12; this ring is made of fritted aluminium; it is electrically spot-welded at D and F to the fixing foil 16 made up of a stack of three or four sheets of elastic metal. The various sections such as 17 and 17' of the heat-insulator 4 have a laminated structure. The end faces C, D and E, F of the guide tube are planed and ground; chamfers G, C and H, E are formed at the ends of each section of the guide tube in order to prevent the corresponding angles from being chipped when the fuel elements move inside the guide tube.

The possibility of the said tube vibrating in sympathy with the turbulent gas flow is very small, regard being had to its geometrical dimensions and the remarkable increase in damping capacity consequent upon irradiation; resistance to abrasion by rapid gas currents is very good; the internal surface of the guide tube is sufficiently hard to prevent any damage by the fuel elements, and behaviour under thermal shocks is excellent.

The transparent form or the drawn opaque form is preferably used, the mechanical properties of the moulded opaque form being slightly inferior.

Figure 6:
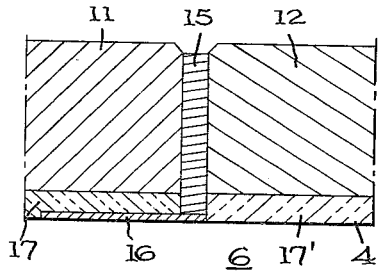
FIGURE 6 illustrates a variant of the said junction.

In the variant illustrated in FIGURE 6, the fritted aluminium ring 15 passes through the heat-insulator 4; the foil 16 welded to the ring 15 is disposed on the external surface of the section 17 of the said insulator.

Figure 7:
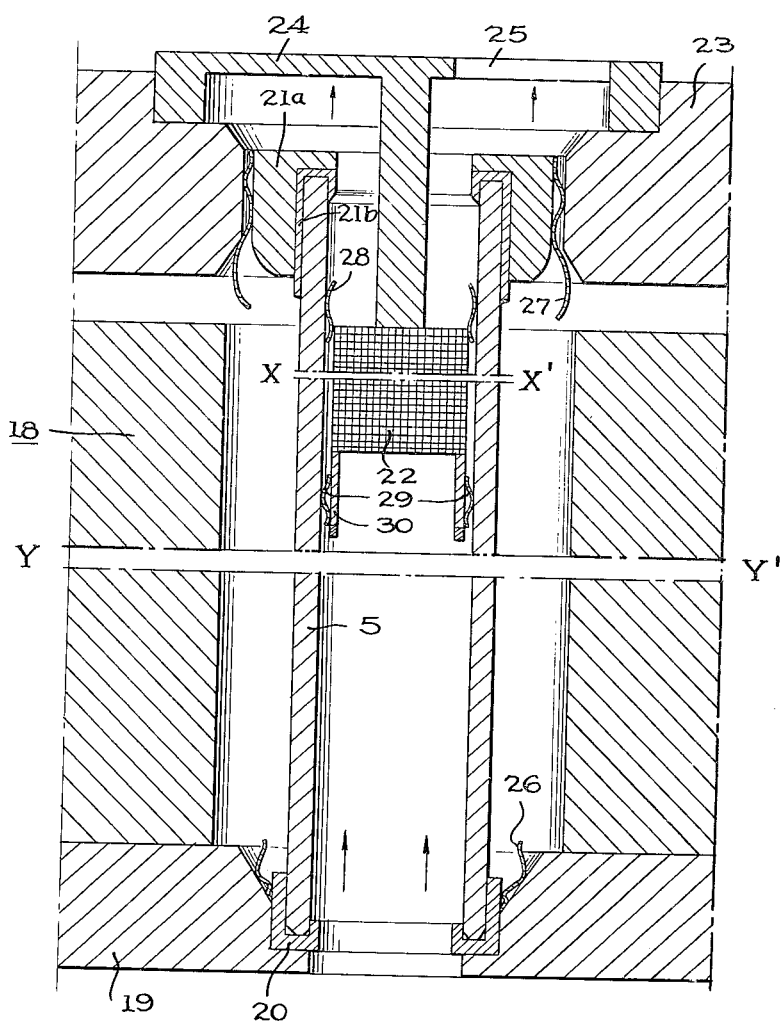
FIGURE 7 illustrates an axial section through a vertical duct in a high-temperature reactor, equipped with a vitreous silica guide tube which also acts as a force tube.

FIGURE 7, which illustrates the second embodiment, shows the moderator 18, which is made of fritted beryllia, and one of the vertical ducts pierced in the beryllia stack 18. Cooling is by high-speed air circulation; this circulation operates upwards. The vitreous silica tube 5 is in one piece, and guides the fuel elements; it channels the air-flow, and is sufficiently thick to act also as a force tube; it is so positioned as to prevent the air-circulation ducts from becoming fast with the moderator block 18. To this end, the tube 5 is disposed in the moderator duct with a large degree of play, of the order of one centimetre; thus any possible deformation of the stack 18 caused by the bricks sliding, by the Wigner effect, or by thermal expansion or fissuring on the part of the bricks, will not involve the risk of interfering with the air-flow geometry provided by the tube 5. The lower plate 19 is made of steel, and supports the weight of the stack 18. The tube 5 rests on the plate 19 by way of a slotted plastic metal ring or bush 20 (very low-carbon stainless steel), and is held at the top by a refractory alloy ring 21a, by way of a slotted bush 21b similar to the bush 20. The fuel elements such as 22 take the form of clusters; they are suspended from the steel upper plate 23 by way of a support 24. Radial orifices such as 25 in the said support enable the cooling air to emerge.

Refractory alloy springs 26 and 27 laterally centre both ends of the tube 5; springs 28 and 29, which are made of Nimonic 90/100 refractory alloy, centre the top of the fuel element and its skirt 30 respectively. The whole height of the fuel element and the whole height of the duct are illustrated in conventional fashion, using cut-aways XX' and YY'.

In this arrangement, the silica tube is solely guided, and has to withstand practically no stress, either lateral or longitudinal; the weight of the fuel elements is taken up by the upper plate 23, and they therefore exert only negligible stresses on the tube 5.

Moreover, this arrangement prevents the cooling air from having any erosive action on the walls of the moderator duct, and likewise the moderator temperature from rising, which would lead to a drop in reactivity. This arrangement furthermore enables the ducts to be independently cooled, so that the mean temperature of the stack may be greatly reduced; in addition, if an accident occurs, not only the fuel elements but also the tube 5 may be withdrawn.

The cooling gas no longer circulates in contact with the moderator stack, so that there is no fear of the latter being eroded. In addition, the vitreous surface of the silica tubes exhibits incontestable resistance to erosion, either by gas flow or by friction from the fuel when the latter is accidentally set in vibration.

Another advantage of this arrangement is that the tube 5 may be made very thick because commercially pure vitreous silica has a very small effective absorption cross-section, and the said tube may assume any geometrical profile (for example a finned profile) tending to increase the mechanical rigidity of the duct in order to prevent undesirable vibration.

Figure 9:
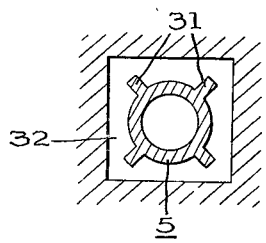
FIGURES 8 and 9 illustrate transverse sections through two possible cross-sections of the said tube and the corresponding duct.
Figure 8:
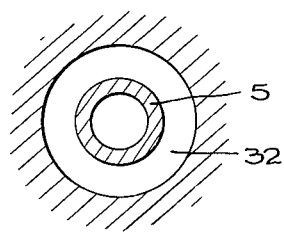

FIGURES 8 and 9 show two possible profiles for the guide tube 5; the first of these profiles is circular, and the second is additionally equipped with fins such as 31. The moderator duct 32 is of circular cross-section in the first case, and of square cross-section in the second. These ducts may be of polygonal cross-section, and the profiles of the tubes 5 may be very varied. The tube withstands air-corrosion excellently, even at a working temperature of 700–800° C.

I claim:

1. In a heterogeneous nuclear reactor having a moderator structure, a plurality of parallel canals within the moderator, combustible elements within the canals and a heat absorbing fluid in the canals absorbing the heat of fission of the combustible elements, walls for each of the canals comprising, from the interior toward the exterior of the canal, a monobloc vitreous silica guide tube having a smooth interior surface, means for absorbing transverse variations in dimension of said guide tube and a force tube, and means at at least one extremity of said guide tube for elastically absorbing longitudinal variations in dimension of said guide tube.

2. In a heterogeneous nuclear reactor having a moderator structure, a plurality of parallel canals in the moderator structure, combustible elements in the canals, and a heat absorbing fluid in the canals absorbing the heat of fission of the combustible elements, walls for each of the canals comprising, from the interior toward the exterior of the canals, first a monobloc vitreous silica guide tube having a smooth interior surface, means for absorbing transverse dimensional variations of said guide tube, said means comprising a tubular thickness of deformable heat insulating material and a force tube, and elastic absorption means for variations in longitudinal dimensions of said guide tube at at least one extremity of said guide tube.

3. In a heterogeneous nuclear reactor having a moderator structure, a plurality of parallel canals within the moderator, combustible elements within the canals and a heat absorbing fluid in the canals absorbing the heat of fission of the combustible elements, walls for each canal comprising, from the interior toward the exterior of the canals, a guide tube, a plurality of vitreous silica tubular elements in axial prolongation of each other comprising said guide tube and having a smooth interior surface, means for absorbing transverse dimensional variations of said guide tube and a force tube and means for elastically absorbing longitudinal dimensional variations of said guide tube at at least one extremity of at least one of said tubular elements.

4. In a heterogeneous nuclear reactor having a moderator structure, a plurality of parallel canals within the moderator, combustible elements within the canals, and a heat absorbing fluid in the canals absorbing the heat of fission of the combustible elements, walls for each of the canals comprising, from the interior toward the exterior of the canal, a guide tube, a plurality of tubular elements of vitreous silica in prolongation of each other and having a smooth interior surface making up said tube, means for absorbing transverse dimensional variations of said tube and a force tube, means for absorbing elastically longitudinal dimensional variations of said vitreous silica tube at at least one of the extremities of at least one of said tubular elements and plastic means between at least two of said tubular elements absorbing longitudinal dimensional variations of said tube.

5. In a heterogeneous nuclear reactor including a moderator structure, a plurality of parallel canals within the moderator, combustible elements in the canals, and a fluid in the canals absorbing the heat of fission of the combustible elements, walls for each of the canals including, from the interior toward the exterior of the canals, a guide tube, a plurality of vitreous silica tubular elements having a smooth interior surface in axial prolongation of each other making up said guide tube, means for absorbing transverse dimensional variations of said tube and a force tube, means for elastically absorbing longitudinal dimensional variations of said guide tube at at least one of the extremities of one of said elements and plastic means between certain of said tubular elements for absorbing longitudinal dimensional variations of said tube, said plastic means comprising rings of metal plastic under the operational conditions of the reactor.

6. In a heterogeneous nuclear reactor having a solid moderator substance within a container, a plurality of parallel canels within the moderator, combustible elements within the canals and a heat absorbing fluid in the canals absorbing the heat of fission of the combustible elements, walls for each of the canals comprising, from the interior toward the exterior of the canal, a guide tube of monobloc vitreous silica having a smooth interior surface with play between the solid moderator substance and said tube to absorb transverse dimensional variations of said tube and means for elastically absorbing longitudinal dimensional variations of said tube at at least one of the extremities of said tube.

7. In a heterogeneous nuclear reactor including a solid moderator substance within a container, a plurality of parallel canals within the moderator substance, combustible elements within the canals, and a heat absorbing fluid within the canals absorbing the heat of fission of the combustible elements, walls for each of the canals comprising, from the interior toward the exterior of the canal, a guide tube of monobloc vitreous silica having a smooth interior surface with play between the solid moderator and said tube to absorb transverse dimensional variations of said tube, one of the ends of said tube being free longitudinally and centering means for said tube including a spring mounted between the external free end of said tube and the opening through the container for the canal.

8. In a heterogeneous nuclear reactor having a solid moderator substance within a container, a plurality of parallel canals within the moderator substance, combustible elements within the canals, a heat absorbing fluid for the heat of fission of the combustible elements in the canals, walls for each of the canals comprising, from the interior toward the exterior of the canal, a monobloc vitreous silica guide tube having a smooth interior surface with play between the solid moderator and said tube absorbing transverse dimensional variations of said tube, means at one end of said tube for elastically absorbing longitudinal dimensional variations of said tube and plastic means at the other end of said tube for absorbing longitudinal dimensional variations of said tube.

9. In a heterogeneous nuclear reactor having a solid moderator substance within a container, a plurality of parallel canals within the moderator substance, combustible elements within the canals, a heat absorbing fluid for the heat of fission of the combustible elements in the canals, walls for each of the canals comprising, from the interior toward the exterior of the canal, a monobloc vitreous silica guide tube having a smooth interior surface with play between the solid moderator and said tube to absorb transverse dimensional variations of said tube, means at one end of said tube for elastically absorbing longitudinal dimensional variations of said tube and plastic means at the other end of said tube for absorbing longitudinal dimensional variations of said tube, said last named means comprising at least one ring of metal plastic under the operating conditions of the reactor.

References Cited in the file of this patent

UNITED STATES PATENTS

| | | |
|---|---|---|
| 714,903 | Hinds | Dec. 2, 1902 |
| 1,293,441 | Houskeeper | Feb. 4, 1919 |
| 1,975,269 | Gray | Oct. 2, 1934 |
| 2,831,807 | McGarry | Apr. 22, 1958 |
| 2,900,315 | Ohlinger | Aug. 18, 1959 |
| 2,915,446 | Liljeblad | Dec. 1, 1959 |

OTHER REFERENCES

BNL 325, "Neutron Cross Sections," Brookhaven National Laboratory, Upton, N.Y. (AEC publication), pp. 102–105, 122, 123.